(12) United States Patent
Patel et al.

(10) Patent No.: US 6,760,669 B2
(45) Date of Patent: Jul. 6, 2004

(54) METHOD AND SYSTEM OF REDUCING INEFFICIENCIES IN AN INTERNAL PERMANENT MAGNET MOTOR USING FUZZY LOGIC

(75) Inventors: Nitinkumar R. Patel, Buena Park, CA (US); Thomas P. O'Meara, Redondo Beach, CA (US)

(73) Assignee: General Motors Corporation, Detroit, MI (US)

( * ) Notice: Subject to any disclaimer, the term of this patent is extended or adjusted under 35 U.S.C. 154(b) by 115 days.

(21) Appl. No.: 09/789,217

(22) Filed: Feb. 20, 2001

(65) Prior Publication Data

US 2002/0116138 A1 Aug. 22, 2002

(51) Int. Cl.[7] .............................................. G01R 15/00
(52) U.S. Cl. ........................................................ 702/57
(58) Field of Search .......................... 702/57; 318/800, 318/138, 803, 802, 257, 147, 811, 254, 432, 253; 420/83, 121, 158

(56) References Cited

U.S. PATENT DOCUMENTS

| | | | | |
|---|---|---|---|---|
| 4,814,677 A | * | 3/1989 | Plunkett ..................... | 318/254 |
| 4,823,056 A | * | 4/1989 | Watanabe et al. ............ | 318/257 |
| 5,272,428 A | * | 12/1993 | Spiegel et al. ............... | 318/803 |
| 5,272,429 A | * | 12/1993 | Lipo et al. ................... | 318/802 |
| 5,652,485 A | * | 7/1997 | Spiegel et al. ............... | 318/147 |
| 5,780,983 A | * | 7/1998 | Shinkawa et al. ........... | 318/254 |
| 5,793,178 A | * | 8/1998 | Biais .......................... | 318/700 |
| 6,008,618 A | | 12/1999 | Bose et al. | |
| 6,373,211 B1 | * | 4/2002 | Henry et al. ................. | 318/432 |

* cited by examiner

*Primary Examiner*—John Barlow
*Assistant Examiner*—Tung Lau
(74) *Attorney, Agent, or Firm*—Christopher DeVries (57) ABSTRACT

A method of reducing loss in an interior permanent magnet drive system is provided. A current input DC link power value is calculated. The current input DC link power value is then compared with a previous input DC link power value. A change in input DC link power value is determined from this comparison. A flux decrement value is calculated. The flux decrement value is based on the change in input DC link power value. A stator current value is generated. The stator current value is based on the flux decrement value. Finally, the stator flux current is reduced, based on the stator current value.

17 Claims, 7 Drawing Sheets

PRIOR ART

| $L ∋ I_{ds(pu)}$ / $∋ P_{ds(pu)}$ | N | P |
|---|---|---|
| PB | PM | NM |
| PM | PS | NS |
| PS | PS | NS |
| ZE | ZE | ZE |
| NS | NS | PS |
| NM | NM | PM |
| NB | NB | PB |

METHOD AND SYSTEM OF REDUCING INEFFICIENCIES IN AN INTERNAL PERMANENT MAGNET MOTOR USING FUZZY LOGIC

FIELD OF THE INVENTION

The present invention relates to electric motor drive controls and, more particularly to a method and system of reducing inefficiencies in an internal permanent magnet motor using fuzzy logic.

BACKGROUND OF THE INVENTION

Interior permanent magnet systems have been receiving a great deal of attention in electric drive applications, because of their higher power density and efficiency. However, one requirement of electric drive applications concerns the need for an optimized propulsion system. This is due to the fact that electric drive applications use battery, or other electric, power sources. If optimized propulsion systems are not being used, a per mile charge of the electric drive application will be reduced, thus affecting the efficiency of the electric drive.

While some systems have been proffered to optimize the propulsion of an electric drive application, none have utilized the principles of fuzzy logic and control to arrive at a means for reducing the loss of the application, thereby increasing efficiency. In conventional loss minimization controllers, large, multi-dimensional look-up tables are required. Because of the fixed-step changes of the control variable, a relatively long time is required to search for the minimum power point, thus increasing the time to achieve optimization of the propulsion system. Additionally, once the system reaches a minimum power point, the controller oscillates around that point to find the fixed-step change of the variable. This does not necessarily achieve and optimum flux level, and may inhibit efficiency.

However, the usage of fuzzy logic, based on efficiency optimization, causes the search time for the optimal flux to be reduced. This is due to the adaptive nature of the fuzzy logic controller. As a result, the step size of the control variable will be reduced, as the system approaches a minimum power point. Furthermore, once the minimum power point has been achieved, the controller preferably oscillates around that point with almost a negligible step change of the control variable, thus retaining a truly optimum flux level.

Accordingly it would be desirable to have a method and system for reducing loss in an interior permanent magnet drive system that overcomes the above disadvantages.

SUMMARY OF THE INVENTION

One aspect of the present invention provides for a method of reducing loss in an interior permanent magnet drive system. In accordance with this aspect, a current input DC link power value is calculated. The current input DC link power value is then compared with a previous input DC link power value. A change in input DC link power value is determined from this comparison. A flux decrement value is calculated. The flux decrement value is based on the change in input DC link power value. A stator current value is generated. The stator current value is based on the flux decrement value. Finally, the stator flux is reduced, based on the stator current value.

Another aspect of the present invention provides for a computer usable medium for storing a program for reducing loss in an interior permanent magnet drive system. In accordance with this aspect, computer readable program code calculates a current input DC link power value. The current input DC link power value is then compared with a previous input DC link power value by the computer readable program code. A change in input DC link power value is determined from this comparison by the computer readable program code. A flux decrement value is calculated. The flux decrement value is based on the change in input DC link power value. A stator current value is generated by the computer readable program code. The stator current value is based on the flux decrement value. Finally, the stator flux is reduced by the computer readable program code, based on the stator current value.

Another aspect of the present invention provides for a system for reducing loss in an interior permanent magnet drive system. In accordance with this aspect, a current input DC link power value is calculated by a calculating means. The current input DC link power value is then compared with a previous input DC link power value by a comparing means. A change in input DC link power value is determined from this comparison by a determining means. A flux decrement value is calculated by a calculating means. The flux decrement value is based on the change in input DC link power value. A stator current value is generated by a generating means. The stator current value is based on the flux decrement value. Finally, the stator flux is reduced by a reduction means, based on the stator current value.

BRIEF DESCRIPTION OF THE DRAWINGS

The above, and other objects, advantages and features of the present invention will be more readily understood from the following detailed description of the preferred embodiments thereof, when considered in conjunction with the drawings, in which like reference numerals indicate identical structures throughout the several views, and wherein.

DETAILED DESCRIPTION OF THE PRESENTLY PREFERRED EMBODIMENTS

Figure 1:
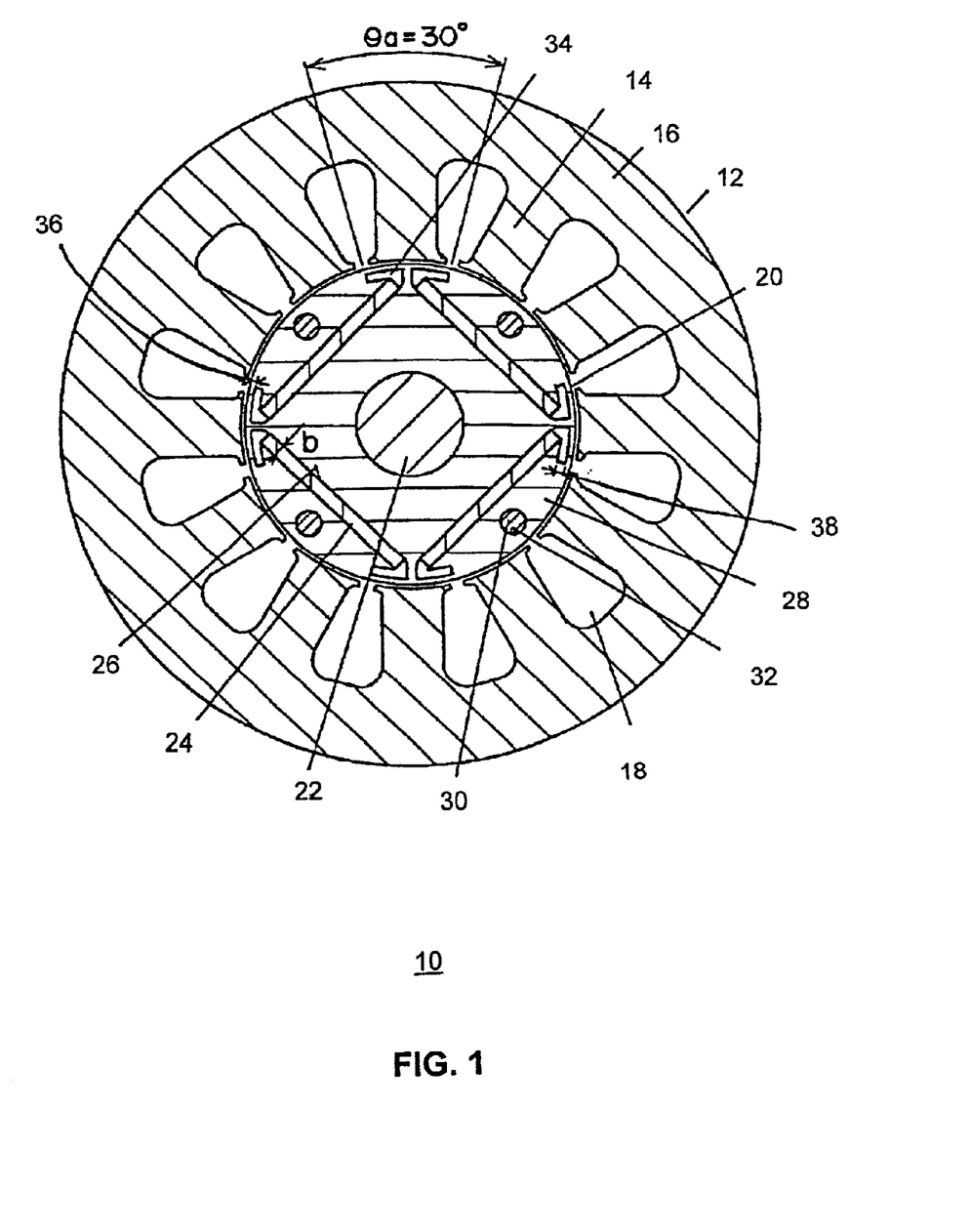
FIG. 1 illustrates a cross-sectional view of an interior permanent magnet motor, in accordance with the present invention.

FIG. 1 is a cross sectional illustration of interior permanent magnet motor 10, as used in the present invention. Referring to FIG. 1, stator 12, which is preferably shaped like a ring, comprises twelve blades of teeth (one blade is shown and noted as reference numeral 14). Stator 12 comprises yoke 16, which couples each of the roots of the twelve blades of teeth 14. Between each of the blades of teeth 14, twelve slots (one slot is noted as reference numeral 18) are formed. The twelve slots 18 may be wound, such as by, for example, a three-phase coil, in the known manner of distributed winding, or by any other means for winding, in such a way that the coil is wrapped around three consecutive and adjacent teeth.

Rotor 20, as shown, is preferably coaxial with stator 12. Additionally, rotor 20 may be shaped like a cylinder. Rotor 20 includes four rotor poles (not shown) facing an inner face of stator 12. Additionally, rotor 20 may be supported by a bearing (not shown) so that rotor 20 can rotate on shaft 22. Within rotor 20, one plate-type permanent magnet (one permanent magnet is shown and noted as reference numeral 24) is inserted in each of four slots (one slit is shown and noted as reference numeral 26). Each of the four slits 26 are formed axially along shaft 22 and disposed at an equal interval in shaft 22 along a rotating direction of rotor core 28. Terminal plate (not shown) is disposed on each axial end of rotor 20. Terminal plate is riveted with pin 30 using through-hole 32, so that permanent magnet 24 is fixed within rotor core 28. In operation, an electric current runs through the stator coil, forming a rotating magnetic field. At this point, rotor poles attract and repel teeth 14 of stator 12. As a result of the attraction and repulsion of teeth 14 of stator 12, rotor 20 may be rotated.

Figure 2:
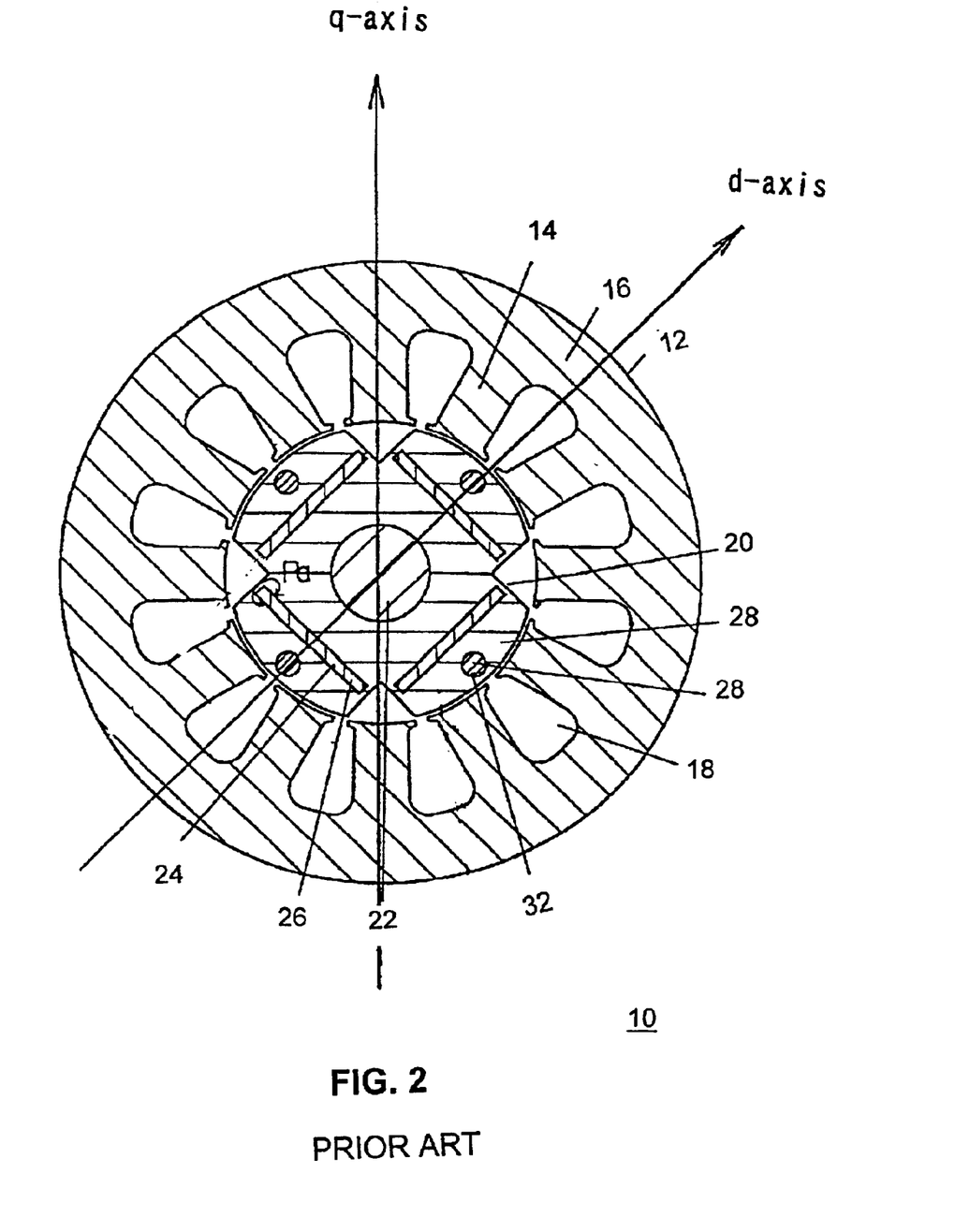
FIG. 2 illustrates a cross-sectional view of an interior permanent magnet motor, in accordance with prior art.

Additionally, rotor 20 includes hole 34 for preventing magnetic flux generated by interior permanent magnet motor 10 from being short-circuited. Hole 34 is adjacent to the outer circumference of rotor core 28 and adjoins slit 26 as well as each end of permanent magnet 24. The structure of interior permanent magnet motor 10 of the present invention, as shown in FIG. 1, prevents the magnetic flux generated by both ends of permanent magnet 24 from being short-circuited, as it occurred in the prior art. An example of an internal permanent magnet motor, in accordance with the prior art, is shown in FIG. 2. For reference, numerals in FIG. 2 correspond to the same elements illustrated in FIG. 1. Returning to FIG. 1, the prevention of magnetic flux short-circuiting is primarily due to the presence of hole 34. As a result of hole 34, the magnetic flux generated by interior permanent magnet motor 10 flows to stator 12, where it contributes to the generation of torque. Furthermore and as a result, interior permanent magnet motor 10 of FIG. 1 can be a highly efficient motor, possessing a lower cogging torque, less noise and less vibration than its counterparts in the prior art.

Hole 34 may preferably be disposed within the outer circumference of rotor core 28. A narrow area, as a part of rotor core 28, remains between hole 34 and the outer circumference of rotor core 28. Clearance 36 between hole 34 and the outer circumference of rotor core 28 preferably comprises a narrow width, from the magnetic (i.e., flux) standpoint. On the other hand, clearance 36 between hole 34 and the outer circumference of rotor core 28 preferably comprises a wide width, from the strength point of view. Preferably, clearance 36 may be the same distance as an air gap or less, and 80% or more than the thickness of the material of rotor core 28, which may be, for example, a laminated steel plate.

Width 38 of hole 34, disposed along the radial direction of rotor core 28, is preferably wide enough to provide an air gap between the teeth 14 and the corresponding, adjoining part of rotor 20. Preferably, width 38 may be at least twice the air gap width.

As shown in FIG. 1, an angle formed by an edge width of hole 34 adjacent to the outer circumference of rotor core 28 with respect to the center of rotor core 28 is preferably narrower than an angle formed by the permanent magnet's longitudinal length facing the outer circumference of rotor core 28 with regard to the center of rotor core 28. That is, a length of the edge width of hole 34 facing the outer circumference of rotor core 28 should be small enough so as not to impair the magnetic flux, generated by the end of permanent magnet 24, as it flows to stator 12. This ensures that the magnetic flux generated by the end of permanent magnet 24 is not short-circuited around the end of permanent magnet 24, but flows to stator 12. Thus, the magnetic flux is able to contribute to the generation of the torque.

As stated above, permanent magnet 24 inserted in slit 26 is shaped similar to a flat plate. This allows permanent magnet 24 to be manufactured with ease and for a low cost. Furthermore, due to its flat plate shape, the dimensions of permanent magnet 24 may be accurately obtained. As a result, a gap between slit 26 and permanent magnet 24 can be narrowed. The narrowing of this gap reduces the magnetic resistance between permanent magnet 24 and rotor core 28. As a result, a highly efficient motor may be realized.

Additionally, the dimensions of internal permanent magnet motor 10 may be further optimized. If, for example, permanent magnet 24 in slit 26 utilizes a rare earth magnet, interior permanent magnet motor 10 may be downsized by a factor of roughly one-half. This is because the rare earth magnet generates a higher density magnetic flux than a ferrite magnet in an interior permanent magnet motor having the same power. Thus, a motor employing the rare earth magnet can generate the same efficiency with roughly half the dimensions. Furthermore, because the rare earth magnet has a high coercive force, the thickness of the interior permanent magnet used may be reduced. However, reducing the thickness of the interior permanent magnet in the conventional rotor structure (as shown in the prior art example of FIG. 2) has generated a large amount of short-circuits of the magnetic flux around both longitudinal ends of the interior permanent magnet. Hole 34, therefore, is an effective preventive measure against the short-circuit of magnetic flux, even in the instance in which a rare earth magnet is utilized. Thus, as a result of the above structure, the efficiency at each load point increases by 12–13%.

Preferably, in the embodiment of rotor 20 shown in FIG. 1, the number of slits 26 used is equal to n. The variable n is equivalent to the number of rotor poles present in interior permanent magnet motor 10. Furthermore, when the radius of rotor core 28 is r, the end thickness of permanent magnet 24 is less than the formula $\pi r/3n$. For example, in the embodiment described with regards to FIG. 1, the number of slits 26 is four (which, as stated, is equal to the number of rotor poles). Therefore, assuming the radius of the rotor core 28 radius is r, the end thickness of permanent magnet 24 is less than $\pi r/12$.

As shown in FIG. 1, in rotor 20, an angle covering one of the portions of rotor core 28 is $\theta_a$. Preferably, the portion of rotor core 28 represents the area described as shown and as follows: from first hole 34 (used for preventing a short-circuit of the magnetic flux of permanent magnet 24) of a first rotor pole, the first hole 34 adjoining to first slit 26 as well as permanent magnet 24 in first slit 26, to second hole 34 (also for preventing a short-circuit of the magnetic flux of permanent magnet 24) inserted in second slit 26 of a second rotor pole adjacent to the above first rotor pole, whereby this second hole 34 is located at an end of second slit 26 and, at the same time, located at a nearer place to second hole 34 than a third hole 34 located at the opposing end of second slit 26. Preferably, the angle of the portion of the rotor core 28, $\theta_a$, is set substantially equal to 120/n degrees.

For example, in the embodiment illustrated in FIG. 1, wherein the number of rotor poles, n, is equal to 4, the angle $\theta_a$ is set at 30° along the rotating angle. Preferably, it is desirable to set angle $\theta_a$ less than clearance 36, which is the clearance between hole 34 and the outer circumference of rotor 20.

Additionally, a non-magnetic material may be provided in all holes 34, or only a portion thereof. This non-magnetic material increases the strength of rotor core 28. To be more specific, a non-magnetic material, such as, for example, brass or aluminum, may be provided in all holes 34 or only a portion thereof as a spacer (or, may be placed into holes 34 and solidified). As a result, permanent magnet 24 in slit 26 will not vibrate due to either transportation or its own operation. Such lack of vibration results in the strengthening of rotor 20, while also contributing to increase the reliability of rotor 20. Furthermore, when aluminum is allowed to flow into the entire rotor 20, by a method such as dicasting, the terminal plate and rivet pins may be casted in one body, further increasing the strength and reliability of rotor core 28, while reducing vibration.

Permanent magnet 24, itself, may be molded in a space limited by the non-magnetic material within the slit 26. That is, when hole 34 has been provided with a heat-proof non-magnetic material, such as, brass or aluminum, and a resin magnet is molded to permanent magnet 24 in the space limited by the non-magnetic element within the rotor core 28, a magnetic pole side of permanent magnet 24 closely contacts with rotor core 28. As a result, the reliability of rotor 20 thus increases. Furthermore, the magnetic resistance of internal permanent magnet motor 10 is lowered, thereby heightening the motor efficiency. In this case, the non-magnetic material can be tapered, and pulled out from rotor 20 after permanent magnet 24 is molded. This prevents a motor loss resulting from an eddy current generated within the non-magnetic material.

Internal permanent magnet motors, similar to that described above with reference to FIG. 1, because of their higher power density and efficiency, have begun to be incorporated in electric drive applications. However, due to the fact that electric drive propulsion uses a battery, or other similar power source, it becomes imperative to have an optimized propulsion system. If an optimized propulsion system is not used, then the mile per charge from the power source will be greatly reduced, thereby affecting electric drive propulsion systems in the current competitive marketplace.

Using the above description of internal permanent magnet motor 10 of FIG. 1, one embodiment of the present invention combines internal permanent magnet motor 10 with the principles of fuzzy logic to reduce the loss in internal permanent magnet motor 10. That is, the present invention reduces overall losses of the electric drive system by searching for an optimum stator flux of internal permanent magnet motor 10 at any operating condition in the torque-speed plane. Doing so thus optimizes the propulsion system of an electric drive system.

Generally speaking, the present invention provides for a method of reducing loss in an interior permanent magnet drive system. According to the present invention, a current input DC link power value is calculated. The current input DC link power value is then compared with a previous input DC link power value. A change in input DC link power value is determined from this comparison. A flux decrement value is calculated. The flux decrement value is based on the change in input DC link power value. A stator current value is generated. The stator current value is based on the flux decrement value. Finally, the stator flux is reduced, based on the stator current value.

Figure 5:
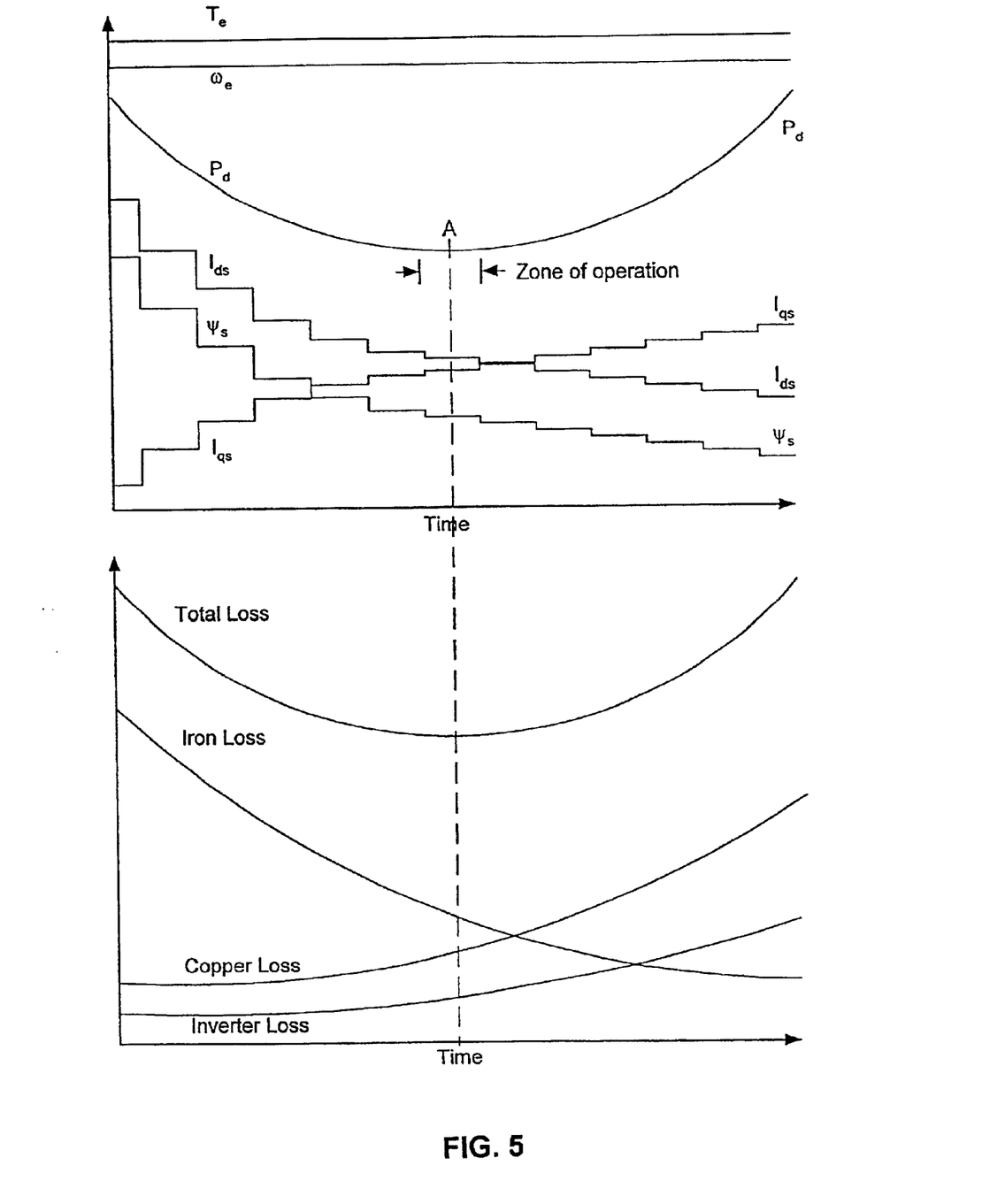
FIG. 5 is a graph illustrating the variables, including stator flux, that are adjusted according to the present invention.

One embodiment of the present invention is illustrated with reference to FIG. 5. As is shown in FIG. 5, the stator flux, $\Psi_s$, may be decreased by concurrently reducing the d-axis stator current, $I_{ds}$. Ultimately, such an action results in the corresponding increase in the q-axis stator current, $I_{qs}$, as shown. Additionally, it is shown by FIG. 5 that the developed torque, $T_e$, remains constant during this process. Furthermore, as the stator flux, $\Psi_s$, is decreased, the iron loss in the system decreases with the attendant increase of copper loss. However, the total system loss (i.e., the combination of both converter and motor losses) also decreases. This results in a decrease of the direct current (DC) link power, $P_d$. The search for the optimum stator flux of internal permanent magnet motor 10 continues until the system settles down and levels at the minimum DC link power, $P_d$. This is represented by Point A in FIG. 5. Any excursion beyond Point A will force the controller of the system to return to the minimum DC link power point, $P_d$, thereby maintaining optimal efficiency. It should be noted that, after the excursion beyond Point A, if the system does not eventually return to Point A, then the efficiency of the system is reduced. Furthermore, efficiency of the system is optimized only during the maintenance of a steady state condition. That is, when both torque and speed are constant. The goal of efficiency is important, inter alia, because, when the system is in a transient condition (i.e., when torque and speed are not maintained at constant values), a reduced magnetic flux will result in a sluggish transient response. Such may not be acceptable or feasible for electric vehicle applications. Thus, the rated stator flux, $\Psi_s$, will be established while the system is in a transient condition. The controller will then preferably wait until the system reaches a steady state. At that point, the system will then start to search for an optimum flux.

A common practice in the loss minimization control of an interior permanent magnet drive is to apply a step (i.e., small periods of incrementation or decrementation) change to a control variable, such as, for example, the stator flux, $\Psi_s$, or the d-axis component of the stator current, $I_{ds}$. Furthermore, the practice then involves waiting until the system reaches a steady state situation. Finally, the practice involves comparing the input power values both before and after the change in the control variable. If the input power value is reduced while the system maintains the output power value at a constant state, another step change is applied to the control variable until the minimum input power point is achieved. A conventional loss minimization controller will take a relatively long time to find an optimum flux point, resulting in some energy loss, and such may entail a long search process. In addition to this, the step change of the control variable must be reduced as the optimum flux point is approached. This, however, is not possible using a conventional loss minimization controller, such as those commonly known in the art. However, where an artificially intelligent loss minimization controller, such as, for example, a fuzzy logic controller, is used, such usage adaptively changes the step size of the control variable. In the end, usage of a fuzzy logic controller will greatly shorten the optimum flux search time.

The foundation of such a fuzzy logic loss minimization control system may be explained more accurately as follows. The internal permanent magnet motor system is normally operated at the rated flux. This allows the system to get the best transient response. However, at light loads, the rated flux operation provides excessive core loss, thus impairing the efficiency of the electric propulsion drive.

Since electric propulsion drives operate at light load most of the time, optimum efficiency can be obtained by programming the flux. On-line efficiency optimization control on the basis of the search, where the flux is decremented in steps until the measured input power for a certain load torque and speed conditions settles down to the lowest value, is a very attractive means for searching for an optimum stator flux of internal permanent magnet motor 10. Such control does not require any knowledge of machine parameters, is completely insensitive to parameter changes and the algorithm utilizing such control is applicable universally to any drive. Moreover, the control can be conveniently implemented by fuzzy logic control. The principal advantage of fuzzy logic control is the fast convergence with an adaptive step size of the control variable. This means that the machine flux decrementation starts in the beginning with a large step size which then gradually decreases so that the optimum flux condition is attained quickly. An additional advantage of fuzzy logic control is that it can accept inaccurate signals corrupted with noise.

Figure 6:
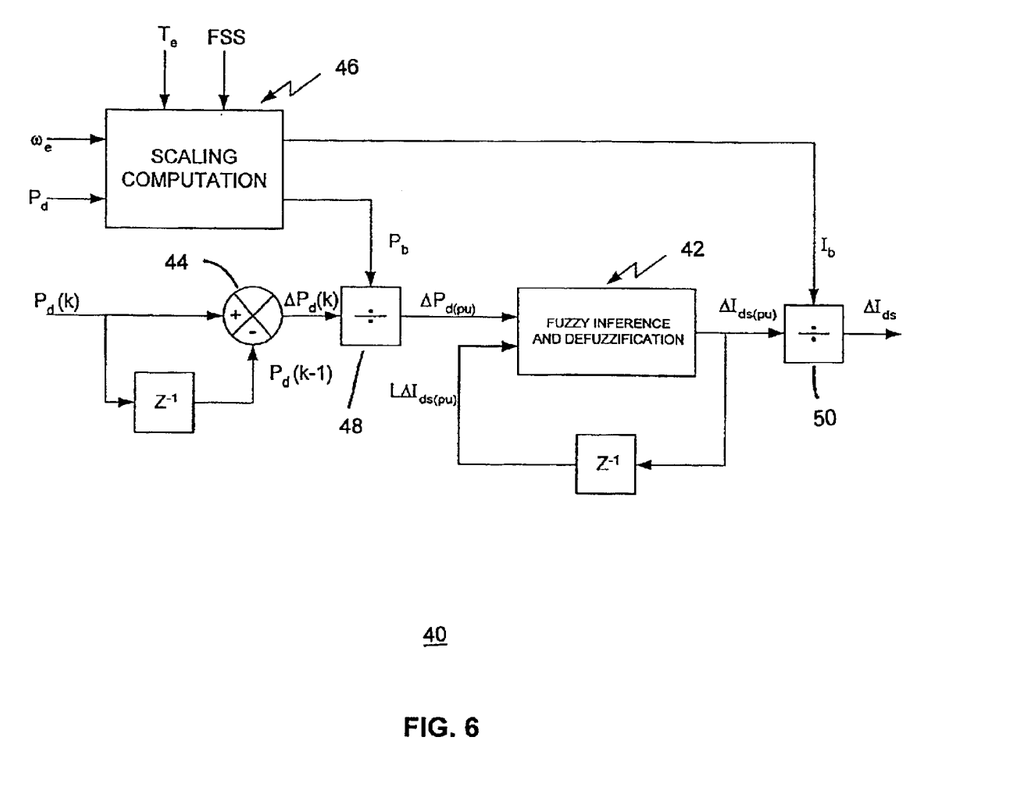
FIG. 6 illustrates a detailed functional diagram of a fuzzy controller, used with the interior permanent magnet motor to achieve the objects of the present invention.

FIG. 6 illustrates a detailed functional diagram of fuzzy controller 40 of the present invention. Note that this control becomes effective only at steady state conditions. These conditions may be detected by the developed torque, $T_e$, and the frequency signals, $\omega_e$. At the onset, a complete fuzzy controller 40 is developed. This fuzzy controller 40 is characterized by the fuzzy logic control storage of the change in DC link power, $\Delta P_d(pu)$, the last stator flux current decrement step, $L\Delta I_{ds}(pu)$ and the flux decrement step, $\Delta I_{ds}(pu)$. For purposes of the present invention, "pu" means "per unit." Furthermore, the above variables may be stored in fuzzy inference and defuzzification table of fuzzy inference and defuzzification block 42, which acts as a fuzzy logic version of a memory location.

Figure 3:
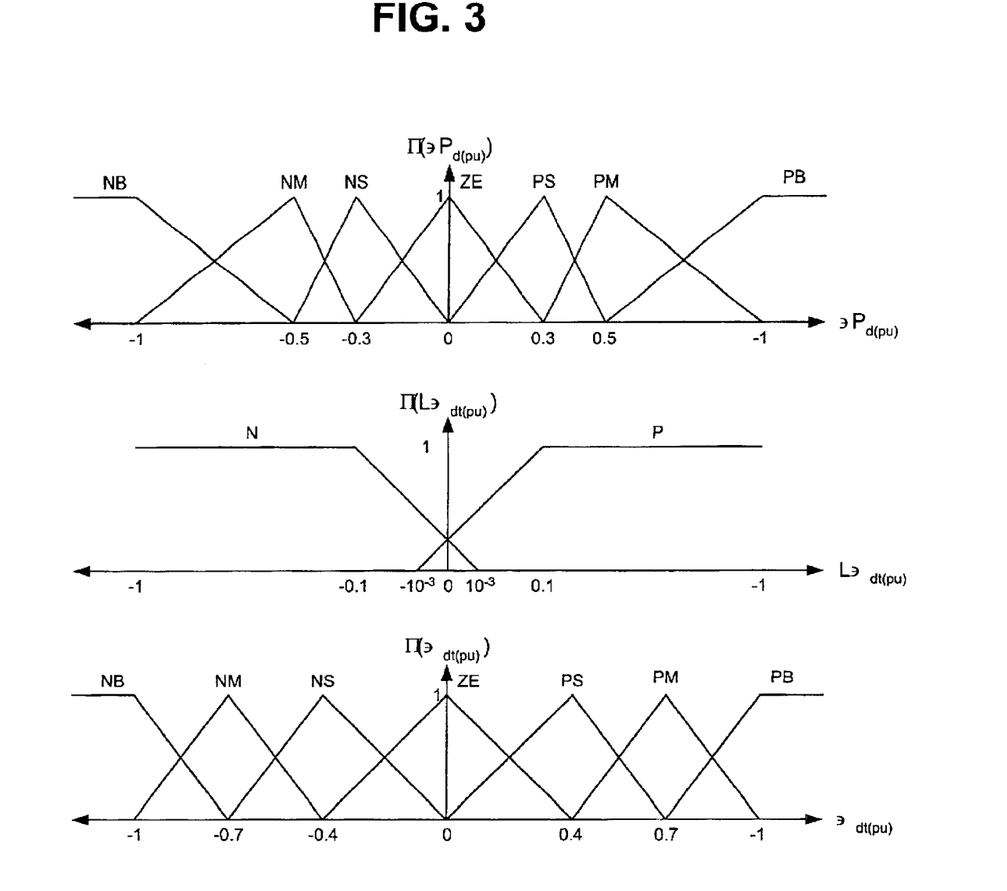
FIG. 3 is a graph illustrating the fuzzy membership functions of the variables in accordance with the present invention.
Figure 4:
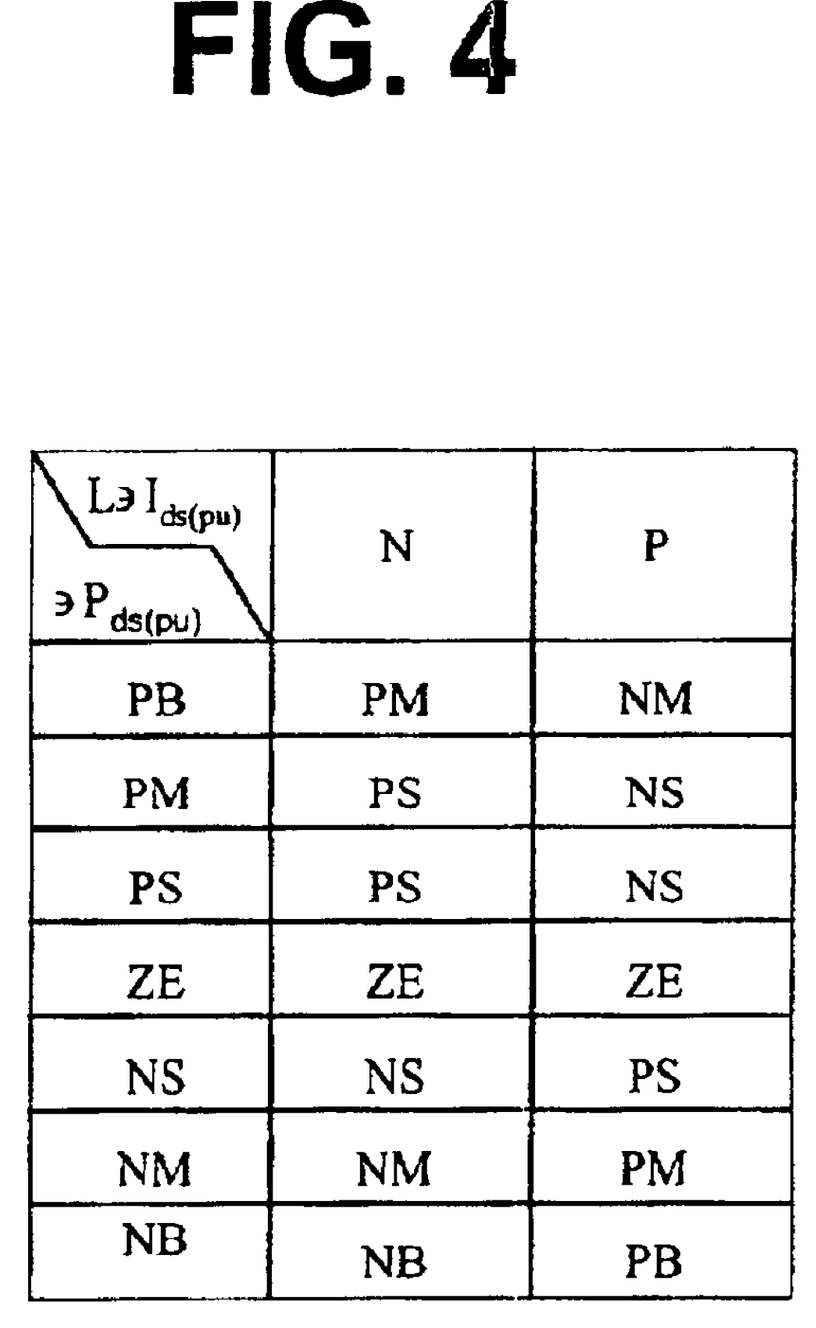
FIG. 4 is a graph comparison chart illustrating the fuzzy logic principles, in accordance with the present invention.

An example of the fuzzy inference and defuzzification table is shown in FIGS. 3 and 4. Referring to FIGS. 3 and 4, the variables DC link power, $\Delta P_d(pu)$, the last stator flux current decrement step, $L\Delta I_{ds}(pu)$ and the flux decrement step, $\Delta I_{ds}(pu)$ may be determined according to the following known method of fuzzy inference and defuzzification: First, the system calculates the degree of membership functions for each inputted variable. This is shown in FIG. 3, in which the membership functions are the "N," "P," "N__" and "P__" lines, as shown. Second, the system utilizes a known comparison principle, such as Sup-Min, to determine the base evaluation. Third, using this comparison principle, the system then determines control signals for each fuzzy rule. Finally, the system defuzzifies the output signal using the known height defuzzification method.

Figure 7:
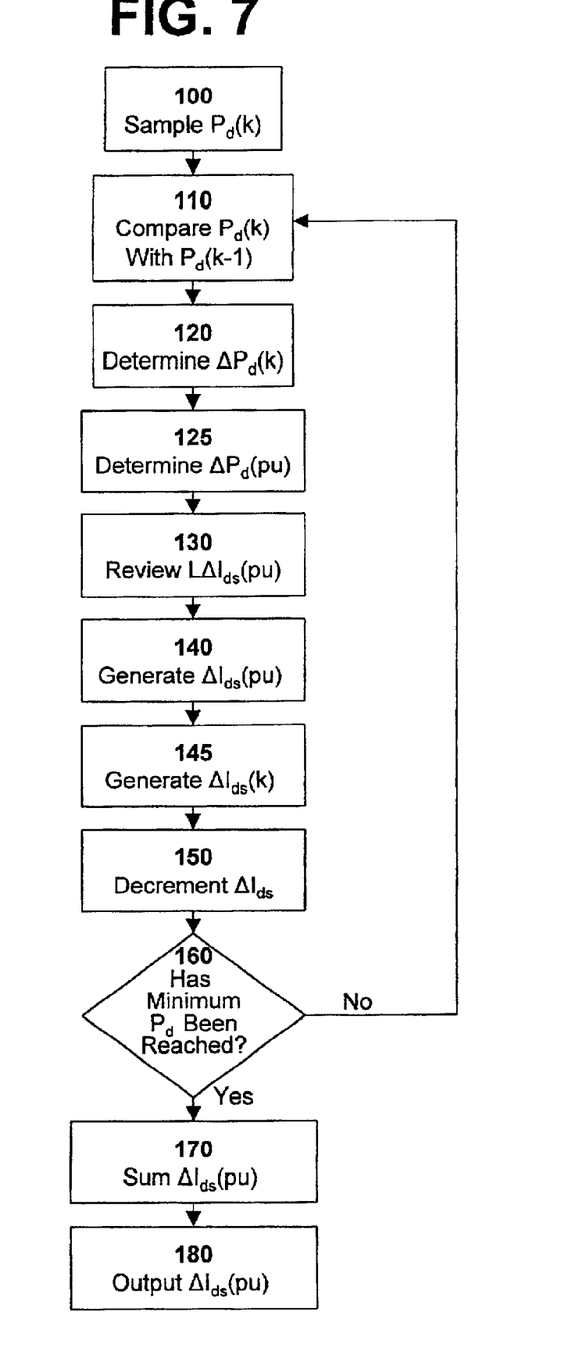
FIG. 7 illustrates a block diagram of a method of reducing loss in an interior permanent magnet motor drive system, in accordance with the present invention.

The operation principle of the embodiment of the present invention as shown in FIG. 6 may be described as follows, with reference to the flow chart of FIG. 7. At a predetermined steady state speed, as well as at a predetermined steady state load torque, an input DC power, $P_d(k)$, is sampled. This is shown at Block 100 of FIG. 7. Preferably, the predetermined steady state speed occurs when the speed of internal permanent magnet motor 10 either maintains a particular value for a predetermined period of time or does not exceed a predetermined threshold (i.e., is at a relative minimum). This threshold is preferably based on prior applications of internal permanent magnet motor 10, and may be, for example, 2–5 revolutions per minute (rpm). Conversely, steady state load torque conditions occur when there is no change in torque, or when the torque does not exceed a predetermined threshold level. This threshold level is also preferably based on prior applications of internal permanent magnet motor 10.

Upon the sampling of the input DC power, $P_d(k)$, the input DC power, $P_d(k)$ is compared with a previous value of input DC power, $P_d(k-1)$ at comparison step location 44. Referring to FIG. 7, this step is shown in Block 110. This previous value of input DC power, $P_d(k-1)$ may be saved and stored in fuzzy inference and defuzzification block 42, and received by comparison step location 44 of fuzzy controller 40 of the present invention. Furthermore, after comparing the input DC power, $P_d(k)$, and the previous value of input DC power, $P_d(k-1)$, fuzzy controller 40 may store the input DC power, $P_d(k)$, in fuzzy inference and defuzzification block 42 for the next iteration of the algorithm of the present invention.

The purpose of the comparison step is to determine the decremental change in input DC power, $\Delta P_d(k)$. This step is illustrated in FIG. 7 at Block 120, and is the output from comparison step location 44. In addition, the last stator flux current decrement step$_+$ $L\Delta I_{ds}(pu)_+$ is also determined, and presented to fuzzy inference and defuzzification block 42. This is illustrated in FIG. 7 at Block 130. Based on the decremental change in input DC power, $\Delta P_d(k)$, as generated in Block 120, as well as the last stator flux current decrement step $L\Delta I_{ds}(pu)$, as generated in Block 130, the flux decrement step, $\Delta I_{ds}(pu)$, is then generated from the fuzzy membership functions and a rule table through fuzzy inference and defuzzification block 42. This is illustrated in Block 140 of FIG. 7.

Preferably, the adjustable gain, $P_b$, generated by scale factor computation block 46, may convert the change in input DC power variable, $\Delta P_d(k)$ to a per unit variable, as shown at conversion block 48 in FIG. 6. This step is illustrated in FIG. 7 at Block 125. Additionally, the adjustable gain, $I_b$, also generated by scale factor computation block 46, may convert the change in the control variable stator flux current, $\Delta I_{ds}$, from a per unit variable, as shown at conversion block 50 in FIG. 6. This step is illustrated in FIG. 7 at Block 145.

The scale factors presented above are given by the equations:

$$P_b = A_1 * \omega_e/\omega_{er} + A_2 \qquad (Eq.\ 1)$$

$$I_b = C_1 * \omega_e/\omega_{er} + C_2 * T_e/T_{er} + C_3 \qquad (Eq.\ 2)$$

In the above equations, $\omega_{er}$ corresponds to the rated frequency; $T_{er}$ corresponds to the rated torque and $A_1$, $A_2$, $C_1$, $C_2$ and $C_3$ correspond to predetermined constants that may be programmed into fuzzy controller 40. From this point, the stator flux current, $\Delta I_{ds}$, is decremented. This is illustrated in FIG. 7 in Block 150.

The decrementation of the stator flux current, $\Delta I_{ds}(pu)$, continues until a minimum input DC power variable, $P_d$, has been reached. This is shown by Decision Block 160 in FIG. 7. Alternatively, the decrementation of the stator flux current, $\Delta I_{ds}(pu)$, continues until a constraint of stator current limit has been reached. The reason for the termination of the decrementation is because any additional decremental change in the stator flux current, $\Delta I_{ds}(pu)$, in the same direction will reverse the polarity of the stator flux current, $\Delta I_{ds}$, leading to the inefficiencies described above.

In any event, once the decrementation of the stator flux current, $\Delta I_{ds}(pu)$, is calculated, the decrements of the stator flux current, $\Delta I_{ds}(pu)$, on a per unit basis, are then summed and ramped at comparison block 50. This is shown in FIG. 7 at Block 170. The stator flux current, $\Delta I_{ds}$, is then coupled to the system, as shown by the output of comparison block 50. This is illustrated in FIG. 7 at Block 180. As stated above, the decrease of the stator flux current, $\Delta Ids$, causes a decrease in the stator flux, $\Psi_s$, thus increasing efficiency of internal permanent magnet motor 10.

The ramping of the stator flux current decrement, $\Delta I_{ds}$ (pu), along with a high gain torque loop heavily attenuates any pulsating torque due to flux decrementation. Furthermore, if any transient condition of the drive is detected, the fuzzy control is abandoned and the rated flux is established to get the optimal transient response. Additionally, note that the minimum $P_d$ point with the stator current limit condition, the drive cannot withstand any sudden load torque jump because of the sluggishness of the flux loop response. For the same reason, the increase of the speed response is somewhat slowed down. However, these limitations do not affect electronic vehicle type drives.

It should be noted that the computer algorithm of the present invention may preferably be any program capable of being stored on an electronic medium, such as, for example, RAM or ROM memory devices, and permitted to be accessed (and consequently run) by fuzzy controller 40. Alternatively, the method may be performed manually by a programmer electronically programming instructions to fuzzy controller 40, either remotely from a location away from fuzzy controller 40, or via an electronic connection with fuzzy controller 40.

Further, it should be appreciated that the embodiments described above are to be considered in all respects only illustrative and not restrictive. The scope of the present invention is indicated by the following claims rather than by the foregoing description. All changes that come within the meaning and range of equivalents are to be embraced within their scope.

We claim:

1. A method of reducing loss in an interior permanent magnet drive system, comprising:
    providing an interior permanent magnet motor and the interior permanent magnet drive system;
    calculating a current input DC link power value;
    comparing the current input DC link power value with a previous input DC link power value to determine a change in input DC link power value;
    calculating a flux decrement value based on the change in input DC link power value;
    generating a stator current value based on the flux decrement value;
    reducing the stator flux current based on the stator current value; and
    summing the stator flux current after the stator flux current has been reduced.

2. The method of claim 1, further comprising reducing the stator flux current based on the stator current value until a minimum input DC link power value has been reached.

3. The method of claim 1, wherein the interior permanent magnet drive system is in a steady state.

4. The method of claim 1, further comprising reducing the stator flux current in a step fashion.

5. The method of claim 1, further comprising ramping the stator flux current after summing the stator flux current.

6. The method of claim 3, wherein the steady state occurs when a torque and a speed of the internal permanent magnet drive system is constant.

7. The method of claim 5, further comprising outputting the stator flux current after ramping the stator flux current.

8. A method of reducing loss in an interior permanent magnet drive system, comprising:
    providing an interior permanent magnet motor and the interior permanent magnet drive system;
    calculating a current input DC link power value;
    comparing the current input DC link power value with a previous input DC link power value to determine a change in input DC link power value;
    calculating a flux decrement value based on the change in input DC link power value;
    generating a stator current value based on the flux decrement value;
    reducing the stator flux current based on the stator current value; and
    wherein the calculation of the flux decrement value is based on fuzzy logic principles.

9. The method of claim 8, wherein the fuzzy logic principles comprise a fuzzy logic membership function and a fuzzy logic rule table.

10. A computer usable program code for storing a program for reducing loss in an interior permanent magnet drive system, comprising:
    an interior permanent magnet motor;
    computer readable program code controlling said interior permanent magnet motor that calculates a current input DC link power value;
    computer readable program code that compares the current input DC link power value with a previous input DC link power value to determine a change in input DC link power value;
    computer readable program code that calculates a flux decrement value based on the change in input DC link power value;
    computer readable program code that generates a stator current value based on the flux decrement value;
    computer readable program code that reduces the stator flux current based on the stator current value; and
    summing the stator flux current after the stator flux current has been reduced.

11. The program of claim 10, further comprising computer readable program code that reduces the stator flux current based on the stator current value until a minimum input DC link power value has been reached.

12. The program of claim 10, further comprising ramping the stator flux current after summing the stator flux current.

13. The program of claim 12, further comprising outputting the stator flux current after ramping the stator flux current.

14. A system for reducing loss in an interior permanent magnet drive system, comprising:
    an interior permanent magnet motor;
    means for calculating a current input DC link power value for said interior permanent magnet motor;
    means for comparing the current input DC link power value with a previous input DC link power value to determine a change in input DC link power value;
    means for calculating a flux decrement value based on the change in input DC link power value;
    means for generating a stator current value based on the flux decrement value;
    means for reducing the stator flux current based on the stator current value; and
    means for summing the stator flux current after the stator flux current has been reduced.

15. The system of claim 14, further comprising means for reducing the stator flux current based on the stator current value until a minimum input DC link power value has been reached.

16. The system of claim 14, further comprising means for ramping the stator flux current after summing the stator flux current.

17. The system of claim 16, further comprising means for outputting the stator flux current after ramping the stator flux current.

* * * * *